United States Patent [19]

Kuwabara et al.

[11] Patent Number: 5,391,581
[45] Date of Patent: Feb. 21, 1995

[54] PRODUCTION METHOD OF FOAMED PARTICLES OF UNCROSSLINKED ETHYLENE-BASED RESIN

[75] Inventors: Hideki Kuwabara; Kazuo Tsurugai; Masaharu Oikawa; Hidehiro Sasaki; Satoru Shioya, all of Utsunomiya, Japan

[73] Assignee: JSP Corporation, Tokyo, Japan

[21] Appl. No.: 168,214

[22] Filed: Dec. 17, 1993

[30] Foreign Application Priority Data

Dec. 24, 1992 [JP] Japan .................................. 4-357551

[51] Int. Cl.$^6$ ............................................. C08J 9/228
[52] U.S. Cl. ........................................ 521/60; 521/58
[58] Field of Search ............................ 521/60, 58, 56

[56] References Cited

U.S. PATENT DOCUMENTS

| | | | |
|---|---|---|---|
| 4,379,859 | 4/1983 | Hirosawa et al. | |
| 4,617,323 | 10/1986 | Kuwabara et al. | 521/60 |
| 4,695,593 | 9/1987 | Kuwabara et al. | 521/60 |
| 4,704,239 | 11/1987 | Yoshimura et al. | |
| 4,937,271 | 6/1990 | Akamatsu et al. | 521/60 |
| 5,015,667 | 5/1991 | Yoshimura et al. | |
| 5,071,883 | 12/1991 | Kuwabara et al. | |

*Primary Examiner*—Morton Foelak
*Attorney, Agent, or Firm*—Sherman and Shalloway

[57] ABSTRACT

Disclosed herein is a method of producing foamed particles of an ethylene-based resin, which have a high expansion ratio and are free from the formation of fine cells, by dispersing particles of the uncrosslinked ethylene-based resin, which are obtained using, as a base resin, an ethylene/α-olefin copolymer containing, as a comonomer component, 1.0–10 wt. % of an α-olefin having 4–10 carbon atoms, in a dispersion medium in the presence of a foaming agent in a closed vessel, heating the resultant dispersion to impregnate the resin particles with the foaming agent, and then releasing the resin particles into a region of a pressure lower than the internal pressure of the vessel at a foaming temperature not lower than the softening temperature of the resin particles, thereby expanding the resin particles. An aliphatic hydrocarbon and/or an alicyclic hydrocarbon and carbon dioxide are used in admixture as the foaming agent in amounts satisfying the following equations (1) and (2) at the same time:

$$E/7 + 0.3 \leq 3x + 2y \leq E/7 + 5.4 \quad (1)$$

$$5.4 \times 10^{-3} \leq x/(yE) \quad (2)$$

in which:
- x: the number of mols of the aliphatic hydrocarbon and/or the alicyclic hydrocarbon per 1000 g of the resin particles;
- y: the number of mols of carbon dioxide per 1000 g of the resin particles; and
- E: an intended bulk expansion ratio for the foamed particles, with the proviso that x and y are greater than 0.

14 Claims, 3 Drawing Sheets

F I G. 1
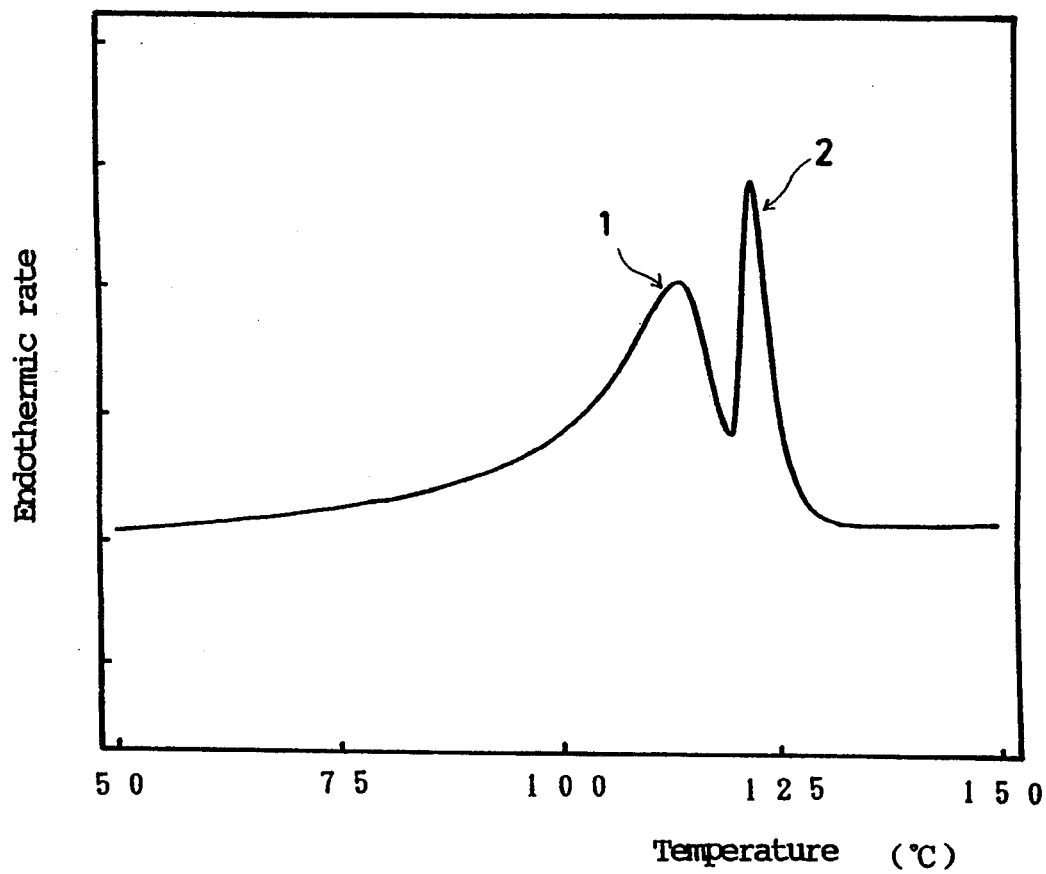

F I G. 3
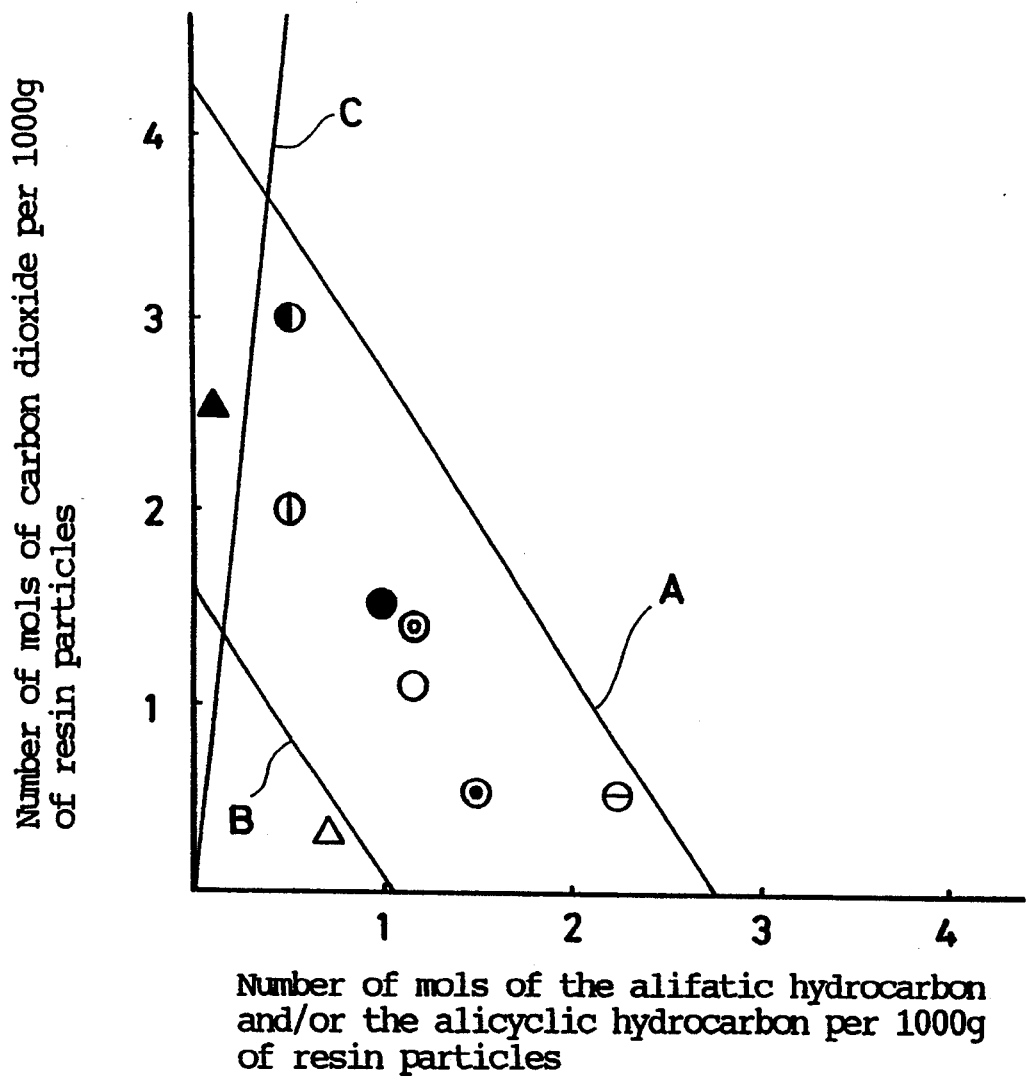

PRODUCTION METHOD OF FOAMED PARTICLES OF UNCROSSLINKED ETHYLENE-BASED RESIN

BACKGROUND OF THE INVENTION

1) Field of the Invention:

The present invention relates to a production method of foamed particles of an uncrosslinked ethylene-based resin, and more particularly to a production method of foamed particles of an uncrosslinked linear low-density polyethylene resin.

2) Description of the Related Art:

As a foaming process of resin particles, it has heretofore been known to disperse particles of a synthetic resin in a dispersion medium such as water in the presence of a volatile foaming agent in a closed vessel, to heat the resultant dispersion to a temperature of at least the softening temperature of the resin particles while keeping the internal pressure of the vessel at least the vapor pressure of the foaming agent, and then to open the vessel at one end thereof so as to release the resin particles and the dispersion medium into an atmosphere of a pressure lower than the internal pressure of the vessel.

As exemplary volatile foaming agents useful in the practice of this process, there have heretofore been widely used halogenated hydrocarbons such as trichlorofluoromethane and dichlorodifluoromethane. However, most of these compounds conventionally used as the foaming agents involve in the circumstances a problem of ozonosphere destruction, or of impracticability due to their expensiveness though little problem of ozonosphere destruction is offered, and/or the like.

Besides, the volatile foaming agents swell the synthetic resin particles, so that the appropriate range of foaming temperature upon their foaming is limited. Therefore, they also involve a problem that the foaming temperature greatly affects the expansion ratio of the resin particles, so that difficulties are encountered on controlling of the expansion ratio.

Many studies were made to solve such problems. The present applicants also carried out an extensive investigation with a view toward solving such problems. As a result, it was previously proposed to use, as a foaming agent, an inorganic gas such as carbon dioxide, which hitherto had no regard for the foaming agent, so as to obtain foamed particles of a synthetic resin (for example, Japanese Patent Publication No. 61227/1987, Japanese Patent Application Laid-Open Nos. 2741/1986 and 4738/1986, etc.).

However, the use of the inorganic gas as a foaming agent involved a problem that foamed particles high in expansion ratio are difficult to stably provide because the impregnating ability of the foaming agent into the synthetic resin particles is poor, and the effect to plasticize the resin and the impregnation speed of the gas vary compared with the volatile foaming agents, and so on. Therefore, the production of foamed particles on the industrial scale has still involved many problems that have to be solved.

The present applicants carried out an extensive investigation with a view toward solving the above problems. As a result, it was found that When an inorganic material such as borax, aluminum hydroxide or zeolite is contained in resin particles, foamed particles high in expansion ratio can be obtained even when an inorganic gas is used as a foaming agent to produce the foamed particles on an industrial scale, and moreover the amount of a volatile foaming agent can be lessened and foamed particles high in expansion ratio can be obtained with a smaller amount of the foaming agent more stably than the method described in Japanese Patent Application Laid-Open No. 4738/1986 even when the conventional volatile foaming agent is used. Applications for patent were thus filed previously (Japanese Patent Application Laid-Open Nos. 166238/1991 and 223347/1991, etc.).

However, when the resin particles containing the above-described inorganic material were impregnated with a foaming agent of the inorganic gas type, in particular, a foaming agent comprising, as a principal component, carbon dioxide to conduct foaming, there were generally problems that cells in the resulting foamed particles tend to become fine, and scatter tends to occur in cell diameter though a difference more or less arises depending on the kind of the inorganic material to be contained. For example, when aluminum hydroxide, zeolite, silica or the like was contained as an inorganic material in resin particles, no scatter occurred in cell diameter, but cells tended to become fine. On the other hand, when borax or the like was contained as an inorganic material, high expansion ratio could be achieved, and a tendency for cells to become fine became less than the case where the above-described inorganic material was contained as the inorganic material, but there was a problem that scatter of cell diameter occurs. Such foamed particles that the scatter of cell diameter was wide, or the cells became fine involved problems that secondary expandability upon their molding is inferior, and the dimensional accuracy of the resulting molded article is poor.

The present applicants further carried out an extensive investigation with a view toward solving the above-described problems. As a result, it was found that when the particle size of the inorganic material to be contained in the resin particles is specifically limited, the scattering of cell diameter can be prevented, so that foamed particles having even cells can be obtained (Japanese Patent Application Laid-Open No. 359037/1992).

In a method in which an inorganic material such as talc, zeolite or borax is added into resin particles to increase the expansion ratio of the resulting foamed particles, the inorganic material to be contained in the resin particles is preferably borax for obtaining foamed particles having a higher expansion ratio. However, if a base resin for resin particles was linear low-density polyethylene, effects to sufficiently improve both increase of expansion ratio and scatter of cell diameter could not be expected by the addition of borax like resin particles comprising, as a base resin, crosslinked low-density polyethylene or a propylene-based resin even when the particle size of borax was controlled to a certain range according to the method in Japanese Patent Application Laid-Open No. 359037/1992.

SUMMARY OF THE INVENTION

The present inventors have carried out an extensive investigation with a view toward solving the above-described problems. As a result, it has been found that when a foaming agent obtained by mixing carbon dioxide and an aliphatic hydrocarbon and/or an alicyclic hydrocarbon in a specific proportion according to the intended bulk expansion ratio for foamed particles is used, the above problems can be solved even when foamed particles are obtained using linear low-density polyethylene as a base resin, leading to completion of the present invention.

In an aspect of the present invention, there is thus provided a method of producing foamed particles of an uncrosslinked ethylene-based resin by dispersing particles of the uncrosslinked ethylene-based resin, which are obtained using, as a base resin, an ethylene/α-olefin copolymer containing, as a comonomer component, 1.0–10 wt. % of an α-olefin having 4–10 carbon atoms, in a dispersion medium in the presence of a mixed foaming agent containing carbon dioxide and an aliphatic hydrocarbon and/or an alicyclic hydrocarbon in a closed vessel, heating the resultant dispersion to impregnate the resin particles with the foaming agent, and then releasing the resin particles into a region of a pressure lower than the internal pressure of the vessel at a foaming temperature not lower than the softening temperature of the resin particles, thereby expanding the resin particles, which comprises using, as the foaming agent, the aliphatic hydrocarbon and/or the alicyclic hydrocarbon and carbon dioxide in amounts satisfying the following equations (1) and (2) at the same time:

$$E/7+0.3 \leq 3x+2y \leq E/7+5.4 \quad (1)$$

$$5.4 \times 10^{-3} \leq x/(yE) \quad (2)$$

in which:
x: the number of mols of the aliphatic hydrocarbon and/or the alicyclic hydrocarbon per 1000 g of the resin particles;
y: the number of mols of carbon dioxide per 1000 g of the resin particles; and
E: an intended bulk expansion ratio for the foamed particles,
with the proviso that x and y are greater than 0.

According to the present invention, the use of the foaming agent obtained by mixing carbon dioxide and an aliphatic hydrocarbon and/or an alicyclic hydrocarbon in a specific proportion when foamed particles are produced using the particles of the uncrosslinked ethylene-based resin, which are composed of an ethylene/α-olefin copolymer containing, as a comonomer component, 1.0–10 wt. % of an α-olefin having 4–10 carbon atoms permits the production of good foamed particles of the uncrosslinked ethylene-based resin, which are sufficient in expansion ratio, even in cell size and free from formation of fine cells. In addition, the limitation of the amounts of carbon dioxide and the aliphatic hydrocarbon and/or the alicyclic hydrocarbon to be used permits the control of expansion ratio of the resulting foamed particles, and the easy provision of good foamed particles of the uncrosslinked ethylene-based resin, which have an intended expansion ratio.

BRIEF DESCRIPTION OF THE DRAWINGS

The above and other objects, features and advantages of the present invention will becomes apparent from the following description of the invention and the appended claims, taken in conjunction with the accompanying drawings in which:

FIG. 1 is a diagram illustrating a first DSC curve of foamed particles of an uncrosslinked linear low-density polyethylene;

FIG. 3 is a reference drawing showing ranges of amounts of an aliphatic hydrocarbon and/or an alicyclic hydrocarbon and carbon dioxide used in a foaming agent for obtaining foamed particles at an average bulk expansion ratio of 20 times.

DETAILED DESCRIPTION OF THE INVENTION AND PREFERRED EMBODIMENTS

Figure 2:
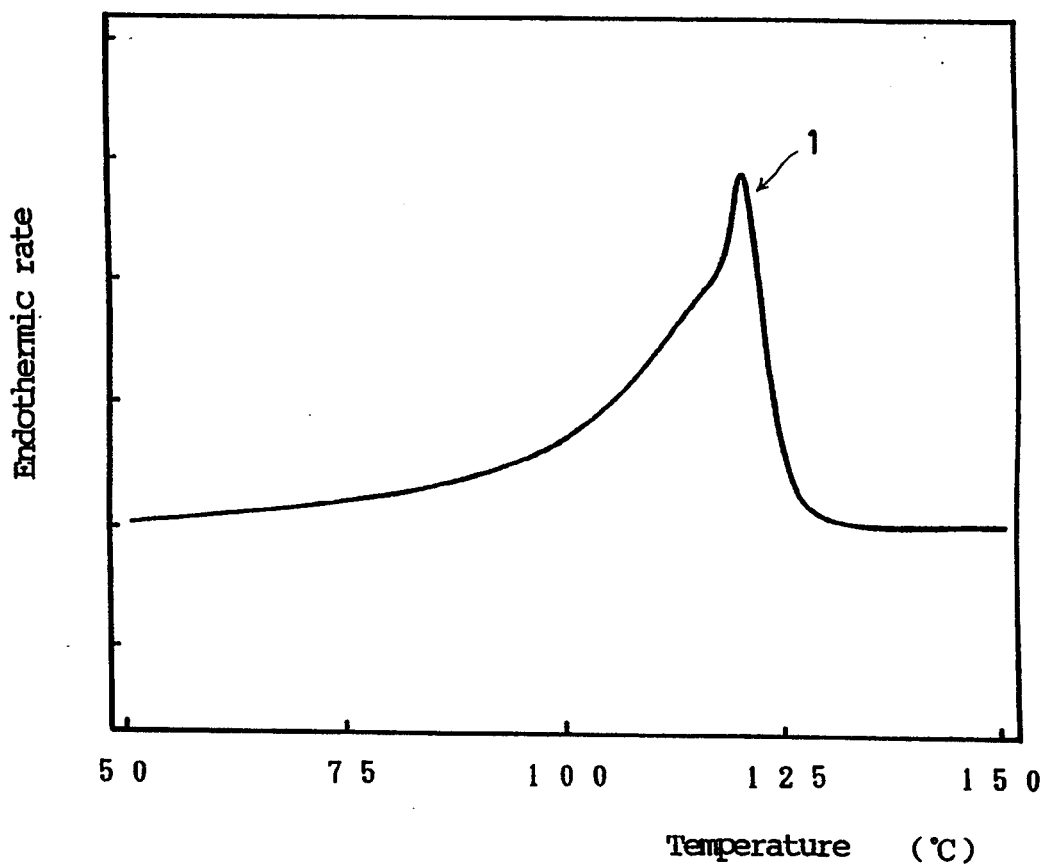
FIG. 2 is a diagram illustrating a second DSC curve of the foamed particles of the uncrosslinked linear low-density polyethylene.

In the present invention, a base resin for the ethylene-based resin particles is an uncrosslinked ethylene/α-olefin copolymer (linear low-density polyethylene) containing, as a comonomer component, 1.0–10 wt. % of an α-olefin. The α-olefin has 4–10 carbon atoms. Examples thereof may include 1-butene, 4-methyl-1-pentene, 1-hexene, 1-octene, etc. If the α-olefin content in the ethylene/α-olefin copolymer is lower than 1.0 wt. %, the brittleness of the resulting foamed particles or molded articles obtained from the foamed particles will become great. On the other hand, if the α-olefin content is higher than 10 wt. %, the stiffness of the resulting foamed particles or molded articles obtained from the foamed particles will become small.

The conventionally-known pelletizing method may be adopted as a method of producing the resin particles from the base resin. As examples thereof, may be mentioned a process in which the base resin is melted and kneaded in an extruder and then extruded from the extruder in the form of a strand, and the thus-extruded resin strand is then cooled, followed by its chopping in proper lengths, or a process in which a resin strand extruded from an extruder is chopped in proper lengths and then cooled.

At least one inorganic material may be contained in the resin particles as needed. In particular, the resin particles may preferably contain the inorganic material. Exemplary inorganic materials contained in the resin particles may include inorganic hydroxides such as aluminum hydroxide, calcium hydroxide and magnesium hydroxide; inorganic carbonates such as calcium carbonate, magnesium carbonate and barium carbonate; inorganic sulfites such as calcium sulfite and magnesium sulfite; inorganic sulfates such as calcium sulfate, aluminum sulfate, manganese sulfate and nickel sulfate; inorganic oxides such as calcium oxide, aluminum oxide and silicon oxide; inorganic chlorides such as sodium chloride, magnesium chloride and calcium chloride; clay minerals or natural minerals such as borax, talc, clay, kaolin and zeolite; etc. Of these, aluminum hydroxide, zeolite, talc and borax are particularly preferred. These inorganic materials may be used either singly or in any combination thereof. The inorganic material may be dispersed or mixed in the resin particles by adding it to the resin upon the pelletizing of the resin, and may preferably have a particle size of 0.1–50 μm, particularly 1–15 μm.

If borax is used as the inorganic material in a foaming process making use of carbon dioxide as a foaming agent, as described above, the scattering of cell diameter of the resulting foamed particles can be prevented by limiting the particle size of borax within a range described in Japanese Patent Application Laid-Open No. 359037/1992. However, if a base resin for resin particles is linear low-density polyethylene, both effects to significantly improve increase of expansion ratio and prevent scattering of cell diameter can not be expected even by the addition of borax having a specific particle size like resin particles comprising, as a base resin, cross-linked low-density polyethylene or a propylene-based resin. According to the method of the present invention, however, sufficient effects to improve increase of expansion ratio and prevent scattering of cell diameter can be achieved without specifically limiting the particle size of borax. This reason is considered to be highly attributable to the influence of the aliphatic hydrocarbon and/or the alicyclic hydrocarbon in the mixture of carbon dioxide and the aliphatic hydrocarbon and/or the alicyclic hydrocarbon, which is used as a foaming agent. However, if borax is also used as the inorganic material in the present invention, more preferable effects can be achieved by using borax having a specific particle size described in Japanese Patent Application Laid-Open No. 359037/1992. Besides, when an inorganic material such as aluminum hydroxide, talc, zeolite or silica is contained in the resin in order to improve the increase of expansion ratio of the resulting foamed particles, cells do not become fine even when the particle size of the inorganic material is not specifically limited. This is attributable to the use of a mixed foaming agent of carbon dioxide and an aliphatic hydrocarbon and/or an alicyclic hydrocarbon as a foaming agent.

In the case of the resin particles containing the inorganic material, it is preferable to use those pelletized into particles of 0.3–7 mm in length and 0.3–5 mm in sectional diameter, particularly 1–3 mm in length and 0.5–3 mm in sectional diameter. It is also preferable to add the inorganic material in a proportion of 0.001–5.0 parts by weight, particularly, 0.003–0.5 part by weight for talc or 0.1–2 parts by weight for borax, aluminum hydroxide or zeolite, per 100 parts by weight of the resin particles.

Since it is considered that when the foaming agent is impregnated into the resin particles dispersed in a dispersion medium, the foaming agent is once dissolved or dispersed in the dispersion medium and then impregnated into the resin particles, the foaming agent is impregnated into the resin particles, for example, by heating and pressurizing the resin particles, foaming agent and dispersion medium in a closed vessel while mixing and stirring them. As a process for impregnating the resin particles with the foaming agent, there may be selected either a process in which the resin particles are dispersed along with the foaming agent in the dispersion medium, and then impregnated with the foaming agent in the course of heating of the resin particles to a foaming temperature, or a process in which the resin particles are dispersed in the dispersion medium to heat the dispersion to or near the foaming temperature of the resin particles, and the foaming agent is then supplied to the dispersion to impregnate the resin particle with the foaming agent at the same temperature. However, the process in which after the dispersion is heated near the foaming temperature, the foaming agent is supplied is preferred because the expansion ratio of the resulting foamed particles can be controlled with ease.

The foaming agent useful in the practice of this invention is a mixture of carbon dioxide and an aliphatic hydrocarbon and/or an alicyclic hydrocarbon. As the aliphatic hydrocarbon, may be used an alkane having 3–8 carbon atoms, such as propane, butane, pentane or hexane. On the other hand, as the alicyclic hydrocarbon, may be used a cycloalkane such as cyclobutane or cyclohexane or an isomer thereof.

The amount of the foaming agent to be used is generally about 2–50 parts by weight per 100 parts by weight of the resin particles. In the method of the present invention, however, supposing the number of mols of the aliphatic hydrocarbon and/or the alicyclic hydrocarbon per 1000 g of the resin particles, the number of mols of carbon dioxide per 1000 g of the resin particles and an intended bulk expansion ratio for the foamed particles are x, y and E, respectively, the amount of the foaming agent, which is suitable for various foaming conditions such as foaming temperature, is selected from the group of x and y, which satisfy the following equations (1) and (2) at the same time, according to the intended bulk expansion ratio of the foamed particles:

$$E/7 + 0.3 \leq 3x + 2y \leq E/7 + 5.4 \qquad (1)$$

$$5.4 \times 10^{-3} \leq x/(yE) \qquad (2)$$

wherein x and y are greater than 0.

The foaming agent obtained by mixing carbon dioxide and the aliphatic hydrocarbon and/or the alicyclic hydrocarbon in amounts selected from the group of x and y, which satisfy the equations (1) and (2) at the same time, is impregnated into the resin particles, thereby permitting the provision of good foamed particles having an expansion ratio (bulk expansion ratio) of 5–50 times, preferably 15–40 times and a cell diameter of 150–450 μm, preferably 200–350 μm. In addition, the expansion ratio can be controlled with ease. The expansion ratio of the foamed particles depends on not only the amount of the foaming agent to be used, but also various foaming conditions, for example, foaming temperature, holding time after the supply of the foaming agent, the presence or absence of the inorganic material in the resin particles or the kind of the inorganic material if present, the conditions of the comonomer component in the base resin such as kind and amount, and the crystalline state of the base resin (the various foaming conditions other than the amount of the foaming agent will hereinafter be called "the various foaming conditions such as foaming temperature"). However, when carbon dioxide and the aliphatic hydrocarbon and/or the alicyclic hydrocarbon are used in such amounts that the value of $3x+2y$ is greater than the value of $E/7+5.4$, the expansion ratio of the resulting foamed particle becomes higher than the intended expansion ratio even if the various foaming conditions such as foaming temperature are controlled within controllable limits. Moreover the rate of closed cells (the proportion of closed cells present in the foamed particle without opening into one another) is reduced. In contrast, when the foaming agent is used in such an amount that the value of $3x+2y$ is smaller than the value of $E/7+0.3$, only foamed particles having an expansion ratio lower than the intended expansion ratio are obtained even if the various foaming conditions such as foaming temperature are controlled in any manner. More specifically, the equation (1) indicates that when the various foaming conditions such as foaming temperature are optimum (the conditions are conditions under which foamed particles having the highest expansion ratio are easy to obtain), the amount of the mixed foaming agent required may be small. In this case, the lower limit of the value of $3x+2y$, which is required to obtain good foamed particles, is $E/7+0.3$.

On the other hand, the equation (1) also indicates that when no inorganic material is added, and the various foaming conditions such as foaming temperature are the severest conditions for obtaining good foamed particles (i.e., the various foaming conditions such as foaming temperature are conditions under which foamed particles having a high expansion ratio are most difficult to obtain), the amount of the mixed foaming agent required must be great. In this case, the upper limit of the value of $3x+2y$, which is required to obtain good foamed particles, is $E/7+5.4$. Besides, when the relationship between the amounts of carbon dioxide and the aliphatic hydrocarbon and/or the alicyclic hydrocarbon to be used according to the intended bulk expansion ratio of the foamed particles is outside the range represented by the equation (2), namely, the value of $x/(yE)$ is greater than $5.4 \times 10^{-3}$, foamed particles having the intended expansion ratio can not also be obtained. In addition, such problems as cells are fine are offered. It is therefore impossible to obtain good foamed particles. In the method of the present invention, the respective numbers of mols x and y of the aliphatic hydrocarbon and/or the alicyclic hydrocarbon, and carbon dioxide per 1000 g of the base resin must be greater than 0. It is essential to use, as a foaming agent, a mixture of carbon dioxide and the aliphatic hydrocarbon and/or the alicyclic hydrocarbon. If carbon dioxide is used singly ($x=0$), or the aliphatic hydrocarbon and/or the alicyclic hydrocarbon is used only ($y=0$), excellent foamed particle cannot be obtained. The single use of carbon dioxide as a foaming agent is accompanied by problems of formation of fine cells, reduction of expansion ratio, etc. On the other hand, if the aliphatic hydrocarbon and/or the alicyclic hydrocarbon is used only as a foaming agent, there will be offered problems of scatter of expansion ratio (the expansion ratio of the resulting foamed particles lowers gradually from the beginning of foaming to the end of foaming) and of safety from the viewpoint of the use of combustible gas. In the present invention, if the value of y is greater than 0, but nearly equal to 0, scatter of expansion ratio may be somewhat recognized even when the mixed foaming agent composed of carbon dioxide and the aliphatic hydrocarbon and/or the alicyclic hydrocarbon in amounts satisfying the equations (1) and (2) is used. However, this scatter involves no particular problem on moldability and the like. If the scatter of expansion ratio is taken into consideration in the present invention, it is particularly preferable to control y to $\geq 0.5$.

The dispersion medium dispersing the resin particles therein may be any medium not dissolving the resin particles therein. Examples thereof may include water, ethylene glycol, glycerol, methanol, ethanol and the like. Water is however used in general.

An anti-fusing agent may be used for the prevention of fusion bonding among the resin particles when the foamable resin particles impregnated with the foaming agent are dispersed in the dispersion medium to heat the dispersion to a foaming temperature. Any anti-fusing agents may be used irrespective of inorganic and organic agents so long as they neither dissolve in the dispersion medium such as water nor melt upon heating. However, inorganic anti-fusing agents are preferred in general. Examples of the inorganic anti-fusing agents may include talc, aluminum oxide, titanium oxide, aluminum hydroxide, basic magnesium carbonate, basic zinc carbonate, calcium carbonate, tricalcium phosphate, magnesium pyrophosphate and the like.

The particle size of the anti-fusing agent may preferably be 0.001–100 μm, particularly, 0.001–30 μm. In general, the amount of the anti-fusing agent to be added may preferably be 0.01–10 parts by weight per 100 parts by weight of the resin particles.

The inorganic anti-fusing agent may be used in combination with an emulsifier. An anionic surfactant, such as, for example, sodium dodecylbenzenesulfonate or sodium oleate, may be used as emulsifier. It is preferable to add the emulsifier in a proportion of 0.001–5 parts by weight per 100 parts by weight of the resin particles in general.

In the method of the present invention, it is preferable to conduct foaming in such a manner that secondary crystals exist in the resulting foamed particles. The foamed particles in which the secondary crystals exist exhibit excellent moldability.

The presence of the secondary crystals can be determined by whether a high-temperature peak on the temperature side higher than a temperature corresponding to an inherent peak caused by absorption of heat upon so-called melting of the base resin appears on a DSC curve obtained by differential scanning calorimetry of the foamed particles such as illustrated in FIGS. 1 and 2, or not. The inherent peak and the high-temperature peak can be determined by conducting the differential scanning calorimetry twice on one and the same sample. More specifically, 2–4 mg of the sample (foamed particles) is first of all heated to 220° C. at a heating rate of 10° C./min by a differential scanning calorimeter to obtain a first DSC curve such as illustrated in FIG. 1. The sample is then cooled from 220° C. to about 40° C. at a cooling rate of 10° C./min and is heated again to 220° C. at a heating rate of 10° C./min, thereby obtaining a second DSC curve such as illustrated in FIG. 2. The inherent peak and high-temperature peak can be determined by comparing the two DSC curves thus obtained with each other.

In FIGS. 1 and 2, numerals 1 and 2 indicate an inherent peak and a high-temperature peak, respectively. The term "inherent peak 1" as used herein means an endothermic peak attendant on the so-called melting of the resin and hence appears on both first and second DSC curves. The temperatures corresponding respectively to the tops of these peaks on the first and second DSC curves may differ a little in some instances. On the other hand, the term "high-temperature peak 2" as used herein means an endothermic peak which appears on the temperature side higher than the above-described inherent peak on the first DSC curve. The presence of the secondary crystals is ascertained by the appearance of this high-temperature peak. When the high-temperature peak does not substantially appear, it is determined that no secondary crystals exist.

Foamed particles containing secondary crystals can generally be obtained by holding the resin particles for a sufficient period of time, usually 5–90 minutes, preferably 10–60 minutes, more preferably 10–30 minutes at a temperature not lower than about (the melting point of the resin−20° C.) but lower than the melting completion temperature, preferably a temperature not lower than (the melting point−15° C.) but lower than (the melting point+5° C.) in a pressure vessel without raising their temperature beyond the melting completion temperature.

The foaming temperature at which the resin particles and the dispersion medium are released into an atmosphere of a pressure lower than the internal pressure of the vessel to expand them is a temperature not lower than the softening temperature of the resin particles. In particular, temperatures near the melting point thereof are preferred. A suitable foaming temperature may preferably be within a range of from (the melting point of the base resin−15° C.) to (the melting point+5° C.). The heating rate upon heating the resin particles to the foaming temperature may preferably be 1°-10° C./min, particularly, 2°-5° C./min. The pressure of the atmosphere under which the foamable resin particles and the dispersion medium are released out of the vessel may be any pressure lower than the internal pressure of the vessel, but is generally atmospheric pressure.

Incidentally, the term "melting point" of the resin as used herein means a temperature corresponding to a top of an endothermic peak (an inherent peak) on a DSC curve obtained by heating about 2–4 mg of a resin particle sample to 220° C. at a heating rate of 10° C./min by a differential scanning calorimeter, cooling the sample from 220° C. to about 40° C. at a cooling rate of 10° C./min and then heating it again to 220° C. at a heating rate of 10° C./min. The term "melting completion temperature" as used herein denotes a melting completion temperature in an endothermic peak (an inherent peak) on the second DSC curve obtained by the above-described measurement. The term "softening temperature" of the resin particles as used herein means a softening temperature as determined under conditions of a load of 4.6 kg/cm$^2$ in accordance with the method of ASTM-D-648.

As described above, the foamed particles are obtained by dispersing the resin particles in the dispersion medium in the presence of the foaming agent in a closed vessel, heating the resultant dispersion to a temperature of at least the softening temperature of the resin particles to impregnate the resin particles with the foaming agent, and then opening the vessel at one end thereof at a foaming temperature not lower than the softening temperature of the resin while keeping the internal pressure of the vessel at least the vapor pressure of the foaming agent so as to release the resin particles and water into an atmosphere of a pressure lower than the internal pressure of the vessel (usually, under atmospheric pressure), thereby expanding the resin particles.

It is necessary for the foamable resin particles to be held in the closed vessel under a pressure such as the particles are not expanded in the vessel, generally, under a pressure of at least 5 kg/cm$^2$.G. In the process in which the foamable resin particles are released into an atmosphere of a pressure lower than the internal pressure of the vessel to expand the resin particles, the expansion ratio of the resulting foamed particles can be stabilized by holding the foamable resin particles for a while at their foaming temperature and then applying a back pressure with nitrogen, air or gas having the same composition as that of the foaming agent while maintaining the internal pressure of the vessel at a pressure of the order of the vapor pressure of the foaming agent or higher so as to release the foamable synthetic resin particles out of the vessel, thereby expanding them. The pressure (the whole pressure in the case of a mixed gas) of the gas supplied for applying the back pressure is generally 10–60 kg/cm$^2$.G, preferably 20–50 kg/cm$^2$.G.

The present invention will hereinafter be described in further detail by the following examples.

Examples 1–12 and Comparative Examples 1–4

An inorganic material was added to linear low-density polyethylene (LLDPE) having a density of 0.920–0.930 g/cm$^3$, an MI of 1.0–2.0 g/10 min in an extruder to melt and knead the resultant mixture. The thus-melted mixture was then extruded in the form of a strand through a die on the tip of the extruder. The extrudate in the form of the strand was quenched in water and then chopped into particles of 2.0 mm in length and 1.5 mm in sectional diameter. Thereafter, 1000 g of the thus-obtained particles, 3000 cc of water, 10 g of tricalcium phosphate as a dispersing agent, 0.1 g of sodium dodecylbenzenesulfonate as an emulsifier and a foaming agent were mixed to heat the mixture to a foaming temperature in a closed vessel (internal volume: 5 l) without raising the temperature of the mixture beyond a melting completion temperature of the resin and to hold it for 20 minutes at the same temperature. While feeding nitrogen to apply a back pressure of 45 kg/cm$^3$, the vessel was then opened at one end thereof to release the foamable resin particles and water under the atmospheric pressure, thereby expanding the resin particles. The average bulk expansion ratios and average cell diameters of the respective foamed particle samples thus obtained were determined. The results are shown in Table 1. Incidentally, the average cell diameter was a value determined by cutting the resultant foamed particles to observe the cut surfaces through a microscope, measuring the respective maximum diameters as to all cells (exclusive of macrocells if present) in a region of an optional 4 mm$^2$-area in each of the cut surfaces to sum the measurements and then dividing the sum total by the number of the cells.

The particle sizes of the inorganic materials added to the base resins in the above-described examples and comparative examples are as follows:

Particle size of aluminum hydroxide: 3 μm
Particle size of 13X-type zeolite: 3 μm
Particle size of borax: 5 μm
Particle size of talc: 2 μm.

The comonomer components in the base resins and amounts thereof, the inorganic materials and amounts thereof, the foaming temperatures, the kinds of the aliphatic hydrocarbons and the amounts of the aliphatic hydrocarbons and carbon dioxide in the foaming agents, all, used in the examples and comparative examples, and the intended expansion ratios are shown in Table 1 together with the above results. The amounts (x) of the aliphatic hydrocarbons and the amounts (y) of carbon dioxide, both, used in the foaming agents in Examples 1–12 satisfy the equations (1) and (2) according to the present invention in all the cases. On the other hand, x and y in Comparative Examples 1–4 do not satisfy the equation (1) and/or the equation (2) in all the cases. Incidentally, FIG. 3 is a reference drawing showing ranges (foaming ranges) of amounts of an aliphatic hydrocarbon and/or an alicyclic hydrocarbon and carbon dioxide used in a foaming agent for obtaining foamed particles at an average bulk expansion ratio of 20 times. In FIG. 3, ◎, ○,●,◐,⊖, ⓛ and ⊙, and △ and ▲ denote the cases of Examples 1, 6, 7, 9, 10, 11 and 12, and the cases of Comparative Examples 2 and 4, respectively. Besides, straight lines A, B and C indicate the straight lines of equations $3x+2y=E/7+5.4$, $3x+2y=E/7+0.3$ and $5.4\times10^{-3}=x/(yE)$, respectively.

TABLE 1

| | Base resin (LLDPE) | | | | Foaming conditions | | | | Intended expansion ratio (times) | True expansion ratio (times) | Avg. cell diam. (mm) | High-temp. peak |
|---|---|---|---|---|---|---|---|---|---|---|---|---|
| | Comonomer | | Inorganic material | | Foaming temp. (°C) | Foaming agent | | | | | | |
| | | | | | | Aliph. hydroc. | | $CO_2$ | | | | |
| | Kind | Amount (wt. %) | Kind | Amount (wt. %) | | Kind | Amount (x mol/kg) | Amount (y mol/kg) | | | | |
| Ex. 1 | 1-Butene | 2.0 | Borax | 0.2 | 116 | Butane | 1.2 | 1.4 | 20 | 21 | 0.28 | Appeared |
| Ex. 2 | " | 2.0 | Aluminum hydroxide | 0.2 | 114 | " | 1.7 | 1.4 | 30 | 30 | 0.35 | Appeared |
| Ex. 3 | " | 2.0 | — | — | 113 | " | 1.7 | 1.9 | 25 | 24 | 0.30 | Appeared |
| Ex. 4 | " | 2.8 | Borax | 0.25 | 113 | Pentane | 2.0 | 1.4 | 40 | 42 | 0.42 | Appeared |
| Ex. 5 | 4-Methyl-1-pentene | 5.2 | " | 0.2 | 118 | " | 1.7 | 1.5 | 35 | 33 | 0.38 | Appeared |
| Ex. 6 | 4-Methyl-1-pentene | 5.2 | — | — | 119 | Butane | 1.2 | 1.1 | 20 | 22 | 0.29 | Appeared |
| Ex. 7 | 1-Hexene | 6.6 | 13X-type zeolite | 0.2 | 118 | " | 1.0 | 1.5 | 20 | 18 | 0.35 | Appeared |
| Ex. 8 | 1-Octene | 9.6 | Borax | 0.3 | 118 | " | 1.2 | 2.0 | 30 | 29 | 0.32 | Appeared |
| Ex. 9 | 1-Butene | 2.0 | — | — | 119 | Butane | 0.5 | 3.0 | 20 | 20 | 0.23 | Appeared |
| Ex. 10 | " | 2.0 | — | — | 113 | " | 2.2 | 0.5 | 20 | 22 | 0.25 | Appeared |
| Ex. 11 | " | 2.0 | Talc | 0.2 | 119 | " | 0.5 | 2.0 | 20 | 19 | 0.20 | Appeared |
| Ex. 12 | " | 2.0 | 13X-type zeolite | 0.5 | 113 | " | 1.5 | 0.5 | 20 | 18 | 0.20 | Appeared |
| Comp. Ex. 1 | " | 2.0 | Borax | 0.2 | 120 | — | — | 2.5 | 15 | 8 | 0.10 | Appeared |
| Comp. Ex. 2 | " | 2.0 | " | 0.2 | 119 | Butane | 0.7 | 0.3 | 20 | 4 | 0.16 | Appeared |
| Comp. Ex. 3 | " | 2.0 | Alumimm hydroxide | 0.2 | 120 | — | — | 2.5 | 13 | 7 | 0.08 | Appeared |
| Comp. Ex. 4 | 4-Methyl-1-pentene | 5.2 | Borax | 0.2 | 121 | Butane | 0.1 | 2.5 | 20 | 10 | 0.15 | Appeared |

What is claimed is:

1. A method of producing foamed particles of an uncrosslinked ethylene-based resin by dispersing particles of an uncrosslinked ethylene-based resin, which are obtained using, as a base resin, a linear low density polyethylene which is an ethylene/α-olefin copolymer containing, as a comonomer component, 1.0–10 wt. % of an α-olefin having 4–10 carbon atoms, in a dispersion medium in the presence of a mixed foaming agent containing carbon dioxide and an aliphatic hydrocarbon and/or an alicyclic hydrocarbon in a closed vessel, heating the resultant dispersion to impregnate the resin particles with the foaming agent, and then releasing the resin particles into a region of a pressure lower than the internal pressure of the vessel at a foaming temperature not lower than the softening temperature of the resin particles, thereby expanding the resin particles, which comprises using, as the foaming agent, the aliphatic hydrocarbon and/or the alicyclic hydrocarbon and carbon dioxide in amounts simultaneously satisfying the following equations (1) and (2):

$$E/7 + 0.3 \leq 3x + 2y \leq E/7 + 5.4 \quad (1)$$

$$5.4 \times 10^{-3} \leq x/(yE) \quad (2)$$

in which:
x represents the number of mols of the aliphatic hydrocarbon and/or the alicyclic hydrocarbon per 1000 g of the resin particles;
y represents the number of mols of carbon dioxide per 1000 g of the resin particles; and
E represents an intended bulk expansion ratio for the foamed particles,
with the proviso that x and y each are greater than 0.

2. The method as claimed in claim 1, wherein the aliphatic hydrocarbon is an alkane having 3–8 carbon atoms.

3. The method as claimed in claim 1, wherein the uncrosslinked ethylene-based resin contains an inorganic material.

4. The method as claimed in claim 3, wherein the uncrosslinked ethylene-based resin contains, as the inorganic material, talc in a proportion of 0.003–0.5 parts by weight per 100 parts by weight of the resin particles.

5. The method as claimed in claim 3, wherein the uncrosslinked ethylene-based resin contains, as the inorganic material, at least one of borax, aluminum hydroxide and zeolite in a proportion of 0.1–2 parts by weight per 100 parts by weight of the resin particles.

6. The method as claimed in any one of claims 1–5, in which the step of heating the resultant dispersion comprises heating the dispersed resin particles to and holding the heated particles at a temperature not lower than (the melting point of the base resin−20° C.) but lower than the melting completion temperature, before the resin particles impregnated with the foaming agent are released out of the vessel.

7. The method as claimed in any one of claims 1–5, which comprises releasing the foamed resin particles from the vessel while maintaining the internal pressure of the vessel at a pressure at least as high as the vapor pressure of the foaming agent with an inorganic gas or a gas having the same composition as that of the foaming agent.

8. The method of claim 3, wherein the inorganic material has a particle size of from 0.1–50 μm.

9. The method of claim 3, wherein the inorganic material has a particle size of from 1–15 μm.

10. The method of claim 1, wherein y is at least 0.5 mols $CO_2$/1000 g resin particles.

11. The method of claim 1 further comprising adding an anti-fusing agent to the dispersion medium prior to heating.

12. The method of claim 11, wherein the anti-fusing agent is an inorganic material.

13. The method of claim 11 further comprising adding an emulsifier to the dispersion medium.

14. The method of claim 1 which comprises expanding the impregnated resin particles to a bulk expansion ratio of 5 to 50 and a cell diameter of 150 to 450 μm.

* * * * *